Dec. 3, 1929.  A. E. YOUNG  1,737,746
METHOD OF AND INSTRUMENT FOR COMPUTING VARIABLES
Filed July 10, 1928  3 Sheets-Sheet 1
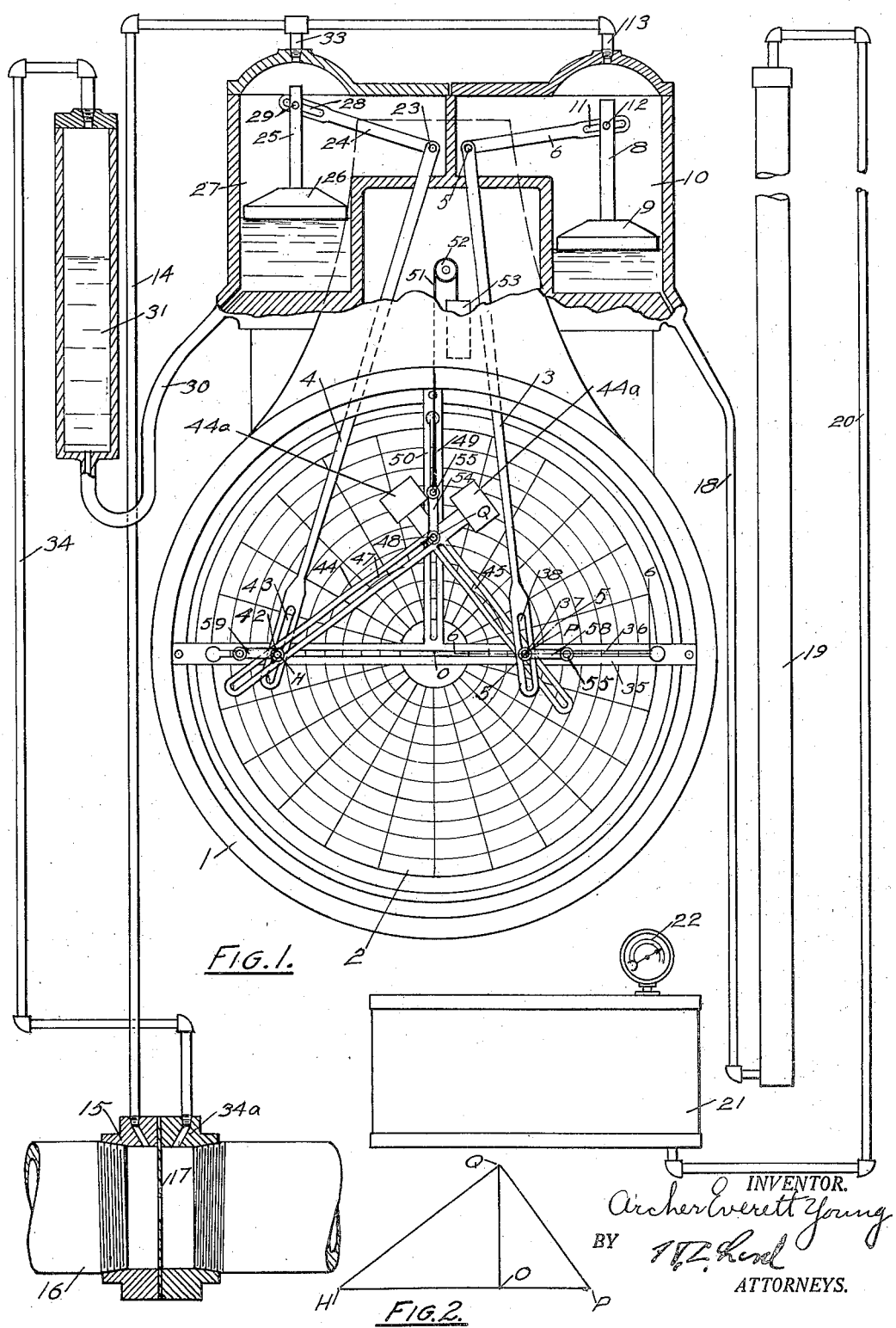
INVENTOR.
Archer Everett Young
BY
ATTORNEYS.

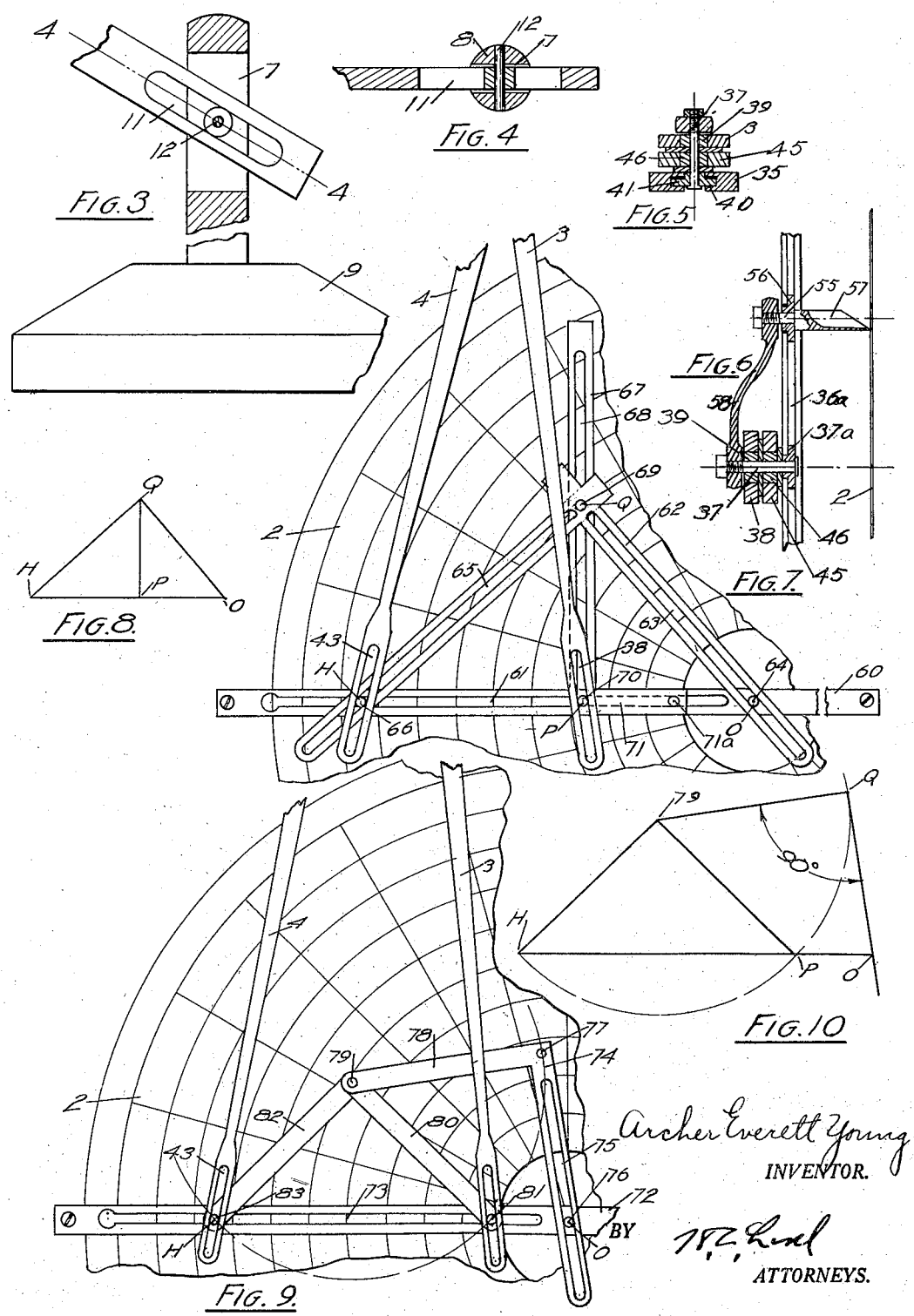

Dec. 3, 1929. A. E. YOUNG 1,737,746
METHOD OF AND INSTRUMENT FOR COMPUTING VARIABLES
Filed July 10, 1928   3 Sheets-Sheet 3

Patented Dec. 3, 1929

1,737,746

UNITED STATES PATENT OFFICE

ARCHER EVERETT YOUNG, OF PITTSBURGH, PENNSYLVANIA

METHOD OF AND INSTRUMENT FOR COMPUTING VARIABLES

Application filed July 10, 1928. Serial No. 291,570.

It is desirable for indicating and recording certain manifestations, such for instance as the pressures involved with orifice meters and other indirect meters, to be able to indicate and to record the square root of the product corresponding to the values or extent of the manifestations, or pressures. With the present invention this is made possible. Broadly speaking the invention is directed to a method and apparatus which will immediately indicate, and, if desired, record the square root of the product of two variables changing with condition changes of a medium which are used as factors in an ultimate measurement, or computation. In carrying out my invention, I utilize certain geometric principles relating to certain geometric figures, applying those principles in mechanical, or tangible form, in an apparatus which maintains the geometric relation and consequently at all times indicates and may be made to record the square root of the product of two other dimensions, or values. Feature and details of the invention will appear from the specification and claims.

Preferable embodiments of the invention are illustrated in the accompanying drawings as follows:—

Fig. 1 shows a front view, partly in section, of an orifice meter.

Fig. 2 a geometric figure illustrating the principle involved in the apparatus shown in Fig. 1.

Fig. 3 an enlarged view of the float mechanism.

Fig. 4 a section on the line 4—4 in Fig. 3.

Fig. 5 a section on the line 5—5 in Fig. 1.

Fig. 6 a section on the line 6—6 in Fig. 1.

Fig. 7 a partial view of a meter indicating a modification from that shown in Fig. 1.

Fig. 8 a geometric figure illustrating the principles involved in the mechanism shown in Fig. 7.

Fig. 9 a front view of a part of a meter showing another modification.

Fig. 10 a geometric figure illustrative of the principles involved in the mechanism shown in Fig. 9.

Figure 11:
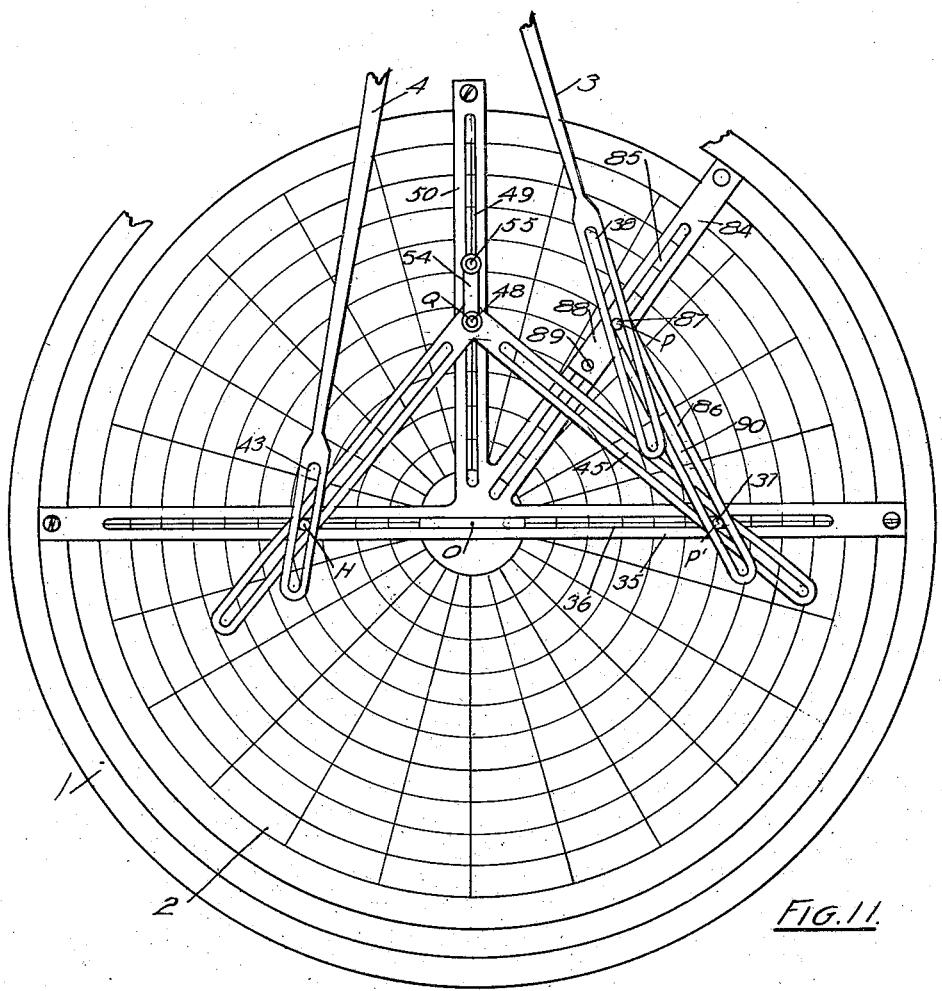

Fig. 11 a front view of a part of a meter showing another modification.

Figure 12:
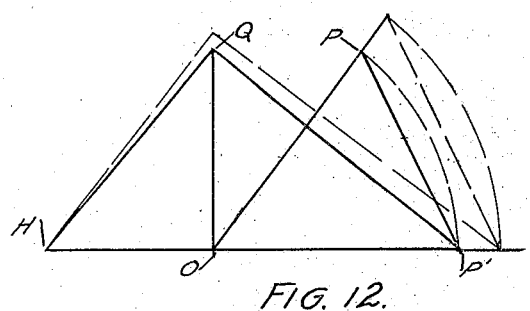

Fig. 12 a geometric figure illustrative of the principles involved in the mechanism shown in Fig. 11.

1 marks the recording case which, it will be understood, comprises the clock mechanism, 2 the recording chart on the meter dial, 3 and 4 operating arms corresponding to the pen arms of the ordinary recording apparatus. The arm 3 is carried by a pivot pin 5. An arm 6 is mounted on the pin 5 and extends at right angles from the arm 3 and passes through a slot 7 in a post 8, the post 8 extending from a float 9. The float 9 is arranged in a chamber 10, the walls of which form a guide for the float. The arm 6 is provided with a slot 11 and a pin 12 extends through the post 8 and the slot 11, thus pivotally connecting the arm 6 and float together. A pipe 13 extends from the upper part of the chamber 10 and this is connected with a pipe 14 extending to a flange 15 on a conduit 16, the pipe 14 leading to the up-stream side of an orifice plate 17 arranged in the conduit. A pipe 18 extends from the chamber 10 and this is connected with an upright pipe 19, the chamber 10 and pipe 18 forming one leg of a U-tube and the pipe 19 the opposite leg. Mercury is provided for this U-tube and the U-tube 19 may be of sufficient height so that the mercury will balance the pressure from the conduit 16 but ordinarily this pressure is so great that it is not convenient to have a column, or pipe 19 of sufficient length to accomplish this purpose and to avoid this excessive length a pipe 20 is carried to a tank 21, which tank is carried at a constant pressure. Thus there is a differential between the constant pressure and the line pressure which, acting through the column, varies the mercury level and consequently the float level so that there is a direct response in the position of the float to the line pressures in the conduit at the up-stream side and this response to variation in perssure is communicated to the arm 3. The arm 4 is mounted on a pin 23. An arm 24 is also mounted on the pin 23 and extends at right angles to the arm 4 through a slot in the post 25 similar to the slot 7. The post 25 is mounted on a float 26 and the float is arranged in a chamber 27, the walls of which form a guide for the float. A slot 28 is arranged in the arm 24 and a pin 29 extends through the post 25 and the slot 28, thus connecting the float and arm pivotally together. A tube 30 extends downwardly from the chamber 27 and communicates with a chamber 31, the chamber 27 and pipe 30 forming one arm, or leg, of a U-tube and a chamber 31 the opposite leg. A pipe 33 extends from the chamber 27 and is connected with the pipe 14 and thus with the up-stream side of the conduit. A pipe 34 leads from the upper end of the chamber 31 and is connected through a flange 34$^a$ with the conduit 16 at the down-stream side of the orifice. The U-tube and chambers are supplied with mercury and the two legs being subjected to the up-stream and down-stream pressures of the conduit the float is responsive to the differential thus established in the ordinary manner and this response is communicated to the arm 4.

A bar 35 extends across the face, or dial of the meter and is rigidly secured to the case 1. This bar is provided with a slot 36 extending longitudinally of the bar, the center of the dial being arranged in line with the center of the slot. A pin 37 moves longitudinally along a slot 38 in the end of the arm 3. A roller 39 may be provided, if desired, on the pin 37, this roller operating in the slot 38 to reduce friction. The walls of the slot 36 are channeled at 40 and the pin 37 is provided with a guide head 41 which is adapted to roll, or slide, in the channel 40. A pin 42 extends through a slot 43 in the arm 4. This pin is provided with the detail mechanism, as the roller 39 which operates on the pin 37 and with a head 41 operating in the channel 40 and moves longitudinally along the slot 36.

A rigid square 44 which may conveniently be formed of thin plate material has one arm provided with a slot 45 through which the pin 37 extends, a roller 46 being supplied, if desired, to reduce friction. The opposite arm of the square has a slot 47 through which the pin 42 extends, a roller similar to 46 being provided in this case, if desired, to reduce friction. A pin 48 is arranged at the vertex of the square and has a head 48$^a$ operating in a channel 49$^a$ in a slot 49, the slot being arranged in a post 50 extending perpendicularly from the bar 35 and from the center of the dial, or chart.

It will be noted that the connection between the arm 3, square 44, bar 35, through the pin 37 permits of pivotal movement and relative sliding movement of all these members on the pin. Likewise it will be noted that the arm 4, square 44 and bar 35 are connected with the pin 42 so that there is relative rotative and sliding movement between all these members.

In the operation of this device as the arms move in response to pressure, in or out, the pins are moved along the slot 36 and as the pins are moved along the slot the square is moved but however it may be moved, its vertex is, by the pin 48, retained in a line vertical to the center of the chart. It will be noted also that either arm 3, or 4 may move while the other arm remains stationary, or both arms may move simultaneously, there being a complete freedom of movement with, however, a response in the elevation, or declination of the square with these movements.

The movement of the arm 3 in response to variations in line pressure is translated into a movement of the pin 37 along the slot 36— a straight line movement, and this in turn moves the square, with a straight line movement of the pin 48 along the slot 49. In like manner, a variation of the differential pressure acting through the arm 4 has a response in a straight line movement of the pin 42 which, in turn, moves the square 44 and thus gives to the pin 48 a like response; but in all these movements the pins 37, 42 and 48 maintain a certain geometric relation. To understand, therefore, the principle on which the device operates, I have shown this geometrically in Fig. 2 and I have marked both in Figs. 1 and 2 the centers of the pins 37, 42 and 48, as P, H, Q respectively, these being ordinarily used in the orifice meter art, P indicating static absolute pressure, H the differential pressure, and Q the square root of the product of these pressures and in Fig. 1 I have marked the intersection of the perpendicular slots 49 and 36 as O, this corresponding to the center of the dial, or chart. It is a well known geometric theorem that in a right angle triangle the perpendicular distance from a right-angle vertex to the hypotenuse equals the square root of the product of one segment of the hypotenuse by the other segment of the hypotenuse, in other words, that $$OQ = \sqrt{OP \times OH}$$

In as much as this relation is maintained at all times in the apparatus above described, the pin 48 indicates on the post 50 a distance from the point O which is the square root of the product of the distances between the point O and the pin 37 by the distance between the point O and the pin 42. This may be indicated, if desired, on the post by a scale, but ordinarily it is preferable to not only indicate it but to record it on a chart. It may be ascertained also by any ordinary measurement on the chart, as by the use of a planimeter.

In order that the chart may be carried slightly out from the center as its zero position, I prefer to carry the recording points outwardly from the pins. In the case of the more essential pin 48 a pen extension 54 is provided and this has a pin 55 which extends through the slot 49 and is provided with a guide head 56 in the slot. A pen 57 on the end of the pin engages the chart in the usual manner. Similar pen extensions 58 and 59 are arranged on the pins 37 and 42.

In order to decrease the friction involved in the movement of the square I prefer to provide extensions on the arms of the square which extensions are provided with weights 44$^a$ making the center of gravity of the square exactly at the pin 48 and I prefer to balance the weight of the square by means of a cord 51 which extends from the square over a pulley 52 and is provided with a weight 53 exactly balancing the weight of the square. Thus the only labor, or energy required to move the square to its different positions through the arms is the energy necessary to overcome the friction and inertia of the parts.

It will be noted that the movement of the pins 37 and 42 is in a straight line whereas the arms 3 and 4 swing on the pivots 5 and 23 so that there is a slight difference in the lengths of the arms as they move in and out. This difference is compensated for by giving to the plates 9 and 26 a straight line movement which, operating on the arms 6 and 24, compensates by lengthening and shortening these arms as they swing for the variation in the lengths of the arms 3 and 4.

The pivot 5 should ordinarily be set vertically above the point on the chart corresponding to the pressure of the constant pressure tank 21.

In computing the flow through an orifice meter and other indirect meters, the ordinary method has been to take the readings of the pressure, take the readings of the differential, add the atmospheric pressure to the reading of the pressure indicated, multiply them together and get the square root of this product. In ordinary practice, this is facilitated by the use of very extensive books of tables. In the present invention this step in the computation is entirely avoided and I start with a record of the square root. From this point, the computation is as is ordinarily practiced, multiplying this square root by a constant, or coefficient of the hourly capacity of the orifice which has been established.

In the modification shown in Fig. 7, much the same principles are involved. A bar 60 is provided performing somewhat the functions of the bar 35. This has a slot 61. A square 62 has a slot 63 in one arm and a pin 64 fixed on the bar 60 extends through this slot. A slot 65 extends through the other arm of the square and a pin 66 extends through this slot, the slot 61 and the slot 43 of the pen arm 4. A post 67 is provided with a slot 68 and a pin 69 extends through the vertex of the square and into this slot, the pin 69 being provided with a head similar to the head 41 and the slots 61 and 68 with channels similar to the channel 40.

A pin 70 extends through the post 67 and into the slot 61 being fixed with the post 67 and slidable in the slot 61. The pin extends through the slot 38 in the pin 3. The post has a lateral extension 71 and a pin 71$^a$ extends through the extension and is fixed therewith, the pin extending into the slot 61 and being slidable therein.

With the movement of the arms 3 and 4 in response to pressure differences, the pin 70 is moved in the slot 61 carrying with it the post 67 and the pin 66 is moved carrying with it the post and altering the position of the square 62, particularly the position of the pin 69 relatively to the pin 64. Likewise a movement of the arm 4 shifts the position of the square in the slot 61 and of the pin 69 in the slot 68 and of the square relatively to the pin 64. The geometric relation of these pins is maintained through all these movements and the principle of the operation is illustrated geometrically in Fig. 8 in which the point O, which is fixed on the bar 60 is at the center of the pin 64, the point P at the center of the point 70, the point H at the center of the pin 66 and the point Q at the center of the pin 69. The geometric theorem applied to this is that in a right angle triangle having a perpendicular from the right angle vertex to the hypotenuse establishes a relation in which, using the letters of Fig. 8, QO, one of the right angle sides is equal to the square root of the product of OP times OH so that at all times the distance between the pin 64 and the pin 69 represents the square root of the product of the distance from the pin 64 to the pin 70 times the distance between the pin 64 and the pin 66 and this corresponds to the geometric relation as we have above described with the aid of Fig. 8.

In the modification shown in Fig. 9 a somewhat different geometric principle is involved to accomplish the same result. A bar 72 is fastened to the case. This bar is provided with a slot 73. A square 74 has one arm provided with a slot 75. A pin 76 fixed on the bar 72 extends through the slot 75 permitting the arm of the square to slide on the pin. A pin carrying a pen is provided at the vertex 77 of the square. An arm 78 of the square is connected by a pin 79 with a link 80. The link 80 is provided with a pin 81, the pin 81 extending through the slot 38 of the arm 3 and the slot 73. A link 82 extends from the pin 79 to a pin 83, the pin extending through the slot 43 in the arm 4 and the slot 73 in the bar 72. The distances between the center of the pin 79, the center of the pin 83, the center of the pin 79, the center of the pin 81, the center of the pin 79, and the center of the pin 77 are equal and as the arms 3 and 4 move, moving the pins 81 or 83 through a response through the links 80 and 82 on the square 78 moving the same upwardly, or downwardly, on the pin 76.

The geometric principle on which this modification operates is illustrated in Fig. 10 in which O marks the center of the pin 76, Q the center of the pin 77, P the center of the pin 81, and H the center of the pin 83. As a geometric theorem, the line OQ is tangent to the circle struck from the center 79 through the points Q, P and H, 79Q, 79P and 79H representing 78, 80 and 82 of the structure. As a geometric theorem the distance QO equals the square root of the line length PO times the line length HO, the line HPO being a line extending from the tangent through any points of the circle as HP and it will be readily noted that this geometric relation is maintained however the points H and P may be moved by the arms so that at all times the position of the point Q relatively to the pin 76 which is at the center of the dial, or chart, represents the square root of the product of the distances from the center 76 to the pins 81 and 83 which indicate the responses to pressure differences operating on the arms. It will be noted that the arms 80 and 82 should be long enough to more than span the maximum distance between H and P.

In Fig. 11, starting with a structure similar to that shown in Fig. 1, the structure is modified so that the point P which is actuated by the pen arm may be arranged off the line OHP, or the line of the bar 35. To accomplish this an arm 84 extends at an angle from the arm 35, this arm being provided with a slot 85. A member 86 is provided with a pin 87 which extends through the slot 85. The part 86 has a rigid extension 88 from which a pin 89 extends through the slot 85 so that the member 86 slides on the arm 84 but maintains its angular relation relatively thereto. The member 86 has a slot 90 which engages the pin 37 on the bar 35. In the triangle formed between the center O of the bar 35, the pin 87 and the pin 37, the angle between the arm 84 and the member 86 is equal to the angle between the member 86 and the bar 35 and this relation is maintained and the distances therefore between O and the pin 87 and O and the pin 37 remain constant. This is illustrated geometrically in Fig. 12, the parts O, H and Q being as in Fig. 1 but marking the part P, as there indicated as P' and making the center of the pin 87 the point P, this being a point off the line OH. It will be noted that inasmuch as the angle OPP' is equal to the angle OP'P and is maintained in this relation the line OP at all times equals the line OP' and consequently as the point P is moved as incident to static pressure modifications the point P' is also moved and the point Q responds in the same manner as it did in Fig. 1 so that where it is desirable to have the point P connected with the pen arm off the line this may be accomplished in the manner here described.

While I have used certain symbols as representing the different points, these symbols being those usually used in connection with the pressure factors in relation to orifice meters I have used these symbols merely for convenience and not as identifying the structure with such measurements, or pressures, except where directly suggested by the claims.

I have heretofore indicated the general manner of recording differential and static pressures for orifice meters and similar instruments and the rather complicated system necessary to compute the quantity from such readings. With the present instrument all this computation is effected directly by the instrument itself, the immediate record made being the square root of the products of the factors entering into the computation. With the orifice meter it is only necessary to multiply this direct reading by the established coefficient. In nearly all such computations general averages are used involving approximations as to the readings and these obviously by cumulation create considerable errors. In the present device such errors are very largely, if not entirely, eliminated.

What I claim as new is:—

1. In a computing instrument, the combination of a linkage connecting four points Q, P, H, O, in which the distance OQ is equal to the square root of the product of the distances OH and OP; means guiding the linkage and maintaining said distance relation between these points as the linkage shifts with the shifting in position of any of the points; and devices responding to condition differences of a medium and controlling the shifting of the linkage to vary the distance OP to correspond to a change in condition to which the devices respond.

2. In a computing instrument, the combination of a linkage connecting four points Q, P, H, O, in which the distance OQ is equal to the square root of the product of the distances OH and OP; means guiding the linkage and maintaining said distance relation between these points as the linkage shifts with the shifting in position of any of the points; and devices responding to condition differences of a medium and controlling the shifting of the linkage to vary the distances OP and OH to correspond to a change in condition to which the devices respond.

3. In a computing instrument, the combination of a linkage connecting four points Q, P, H, O, in which the distance OQ is equal to the square root of the product of the distances OH and OP and in which the points P, H, O are in alinement; means guiding the linkage and maintaining said alinement and distance relation between said points as the linkage shifts with the shifting in position of any of the points; and devices responding to condition differences of a medium controlling the shifting of the linkage to vary the distance OP to correspond to a change in condition to which the devices respond.

4. In a computing instrument, the combination of a linkage connecting four points Q, P, H, O, in which the distance OQ is equal to the square root of the product of the distances OH and OP and in which the points P, H, O, are in alinement; means guiding the linkage and maintaining said alinement and distance relation between said points as the linkage shifts with the shifting in position of any of the points; and devices responding to condition differences of a medium controlling the shifting of the linkage to vary the distances OP and OH to correspond to a change in condition to which the devices respond.

5. In a computing instrument, the combination of a linkage connecting four points Q, P, H, O, comprising a square having the point Q at the vertex of the square and the line OQ extended forming one line of the square and in which the distance QQ is equal to the square root of the product of the distances OH and OP; means guiding the linkage and maintaining said distance relation between these points as the linkage shifts with the shifting in position of any of the points; and devices responding to condition differences of a medium and controlling the shifting of the linkage to vary the distance OP to correspond to a change in condition to which the devices respond.

6. In a computing instrument, the combination of a linkage connecting four points Q, P, H, O, in which the points P, H, O, are in alinement and the point Q at the vertex of a square and comprising links of equal length extending from a pivotal connection to the points P and H, one side of the square being pivotally secured to the links at the pivotal connection and at a distance from the vertex of the square equal to the length of each link and the other side of the square intersecting the line PHO at O, means guiding the linkage and maintaining said alinement and distance relation between said points as the linkage shifts with the shifting in position of any of the points; and devices responding to condition differences of a medium and controlling the shifting of the linkage to vary the distance OP to correspond to a change in condition to which the devices respond.

7. In a computing instrument, the combination of a linkage connecting four points Q, P, H, O, in which the points P, H, O, are arranged on a bar and the point Q at the vertex of a square and comprising links of equal length and extending from a pivotal connection to the bar, said links being pivotally and slidingly connected with the bar at the points P and H, one side of the square being pivotally secured to the links at the pivotal connection at a distance from the vertex of the square equal to the length of each link and the other side of the square being pivotally connected with the bar at the point O, means shifting one of the connection points between the bar and link to vary the distance relations between the points OP and OH; and devices responding to condition differences of a medium and controlling the shifting of the linkage to vary the distance OP to correspond to a change in condition to which the devices respond.

8. In a computing instrument, the combination of a linkage connecting four points Q, P, H, O, in which the distance OQ is equal to the square root of the product of the distances OH and OP; means guiding the linkage and maintaining said distance relation between these points as the linkage shifts with the shifting in position of any of the points; and pressure responsive devices shifting the linkage to vary the distance OP to correspond to pressure differences responded to by the devices.

9. In a computing instrument, the combination of a linkage connecting four points Q, P, H, O, in which the distance OQ is equal to the square root of the product of the distances OH and OP; means guiding the linkage and maintaining said distance relation between these points as the linkage shifts with the shifting in position of any of the points; and pressure responsive devices shifting the linkage to vary the distances OP and OH to correspond to pressure differences responded to by the devices.

10. In a computing instrument, the combination of a linkage connecting four points Q, P, H, O in which the points P, H, O, are arranged on a bar and the point Q at the vertex of the square and comprising links of equal length and extending from a pivotal connection to the bar, said links being pivotally and slidingly connected with the bar at the points P and H, one side of the square being pivotally secured to the links at the pivotal connection at a distance from the vertex of the square equal to the length of each link and the other side of the square being pivotally connected with the bar at the point O, means shifting one of the connection points between the bar and link to vary the distance relations between the points OH and OP; and pressure responsive devices shifting the linkage to vary the distance OP to correspond to pressure differences responded to by the devices.

11. In a computing instrument, the combination of a linkage connecting four points Q, P, H, O, in which the distance OQ is equal to the square root of the product of the distances OH and OP; means guiding the linkage and maintaining said distance relation between these points as the linkage shifts with the shifting in position of any of the points; and devices, one responding to differences between two pressures and the other responding to one of said pressures, said devices acting on the linkage shifting the points P and H to correspond to variations in the pressures.

12. In a computing instrument, the combination of a linkage connecting four points Q, P, H, O, in which the distance OQ is equal to the square root of the product of the distances OH and OP and in which the points P, H, O are in alinement; means guiding the linkage and maintaining said alinement and distance relation between said points as the linkage shifts with the shifting in position of any of the points; and pressure devices, one responding to differences between two pressures and the other responding to one of said pressures, said devices acting on the linkage shifting the points P and H to correspond to variations in the pressures.

13. In a computing instrument, the combination of a linkage connecting four points Q, P, H, O, in which the points P, H, O, are arranged on a bar and the point Q at the vertex of a square and comprising links of equal length and extending from a pivotal connection to the bar, said links being pivotally and slidingly connected with the bar at the points P and H, one side of the square being pivotally secured to the links at the pivotal connection at a distance from the vertex of the square equal to the length of each link and the other side of the square being pivotally connected with the bar at the point O, means shifting one of the connection points between the bar and link to vary the distance relations between the points OP and OH; and devices, one responding to differences between two pressures and the other responding to one of said pressures, said devices acting on the linkage shifting the points P and H to correspond to variations in the pressures.

14. In a computing instrument, the combination of a linkage connecting four points Q, P, H, O, in which the distance OQ is equal to the square root of the product of the distances OH and OP; means guiding the linkage and maintaining said distance relation between these points as the linkage shifts with the shifting in position of any of the points; and mechanism recording the computations of the instrument.

15. In a computing instrument, the combination of a linkage connecting four points Q, P, H, O, comprising a square having the point Q at the vertex of the square and in which the distance OQ is equal to the square root of the product of the distances OH and OP; means guiding the linkage and maintaining said distance relation between these points as the linkage shifts with the shifting in position of any of the points; and mechanism recording the computations of the instrument.

16. In a computing instrument, the combination of a linkage connecting four points Q, P, H, O, in which the points P, H, O, are in alinement and the point Q at the vertex of a square and comprising links of equal length extending from a pivotal connection to the points P and H, one side of the square being pivotally secured to the links at the pivotal connection and at a distance from the vertex of the square equal to the length of each link and the other side of the square intersecting the line PHO at O, means guiding the linkage and maintaining said alinement and distance relation between said points as the linkage shifts with the shifting in position of any of the points; and mechanism recording the computations of the instrument.

17. In a computing instrument, the combination of a linkage connecting four points Q, P, H, O, in which the distance OQ is equal to the square root of the product of the distances OH and OP; means guiding the linkage and maintaining said distance relation between these points as the linkage shifts with the shifting in position of any of the points; devices responding to condition differences of a medium and controlling the shifting of the linkage to vary the distance OP to correspond to a change in condition to which the devices respond; and mechanism recording the computations of the instrument.

18. In a computing instrument, the combination of a linkage connecting four points Q, P, H, O, in which the distance OQ is equal to the square root of the product of the distances OH and OP; means guiding the linkage and maintaining said distance relation between these points as the linkage shifts with the shifting in position of any of the points; pressure responsive devices shifting the linkage to vary the distance OP to correspond to pressure differences responded to by the devices; and mechanism recording the computations of the instrument.

19. In a computing instrument, the combination of a linkage connecting four points Q, P, H, O, in which the distance OQ is equal to the square root of the product of the distances OH and OP; means guiding the linkage and maintaining said distance relation between these points as the linkage shifts with the shifting in position of any of the points; devices, one responding to differences between two pressures and the other responding to one of said pressures, said devices acting on the linkage shifting the points P and H to correspond to variations in the pressures; and mechanism recording the computations of the instrument.

20. In a computing instrument, the combination of a linkage connecting four points Q, P, H, O, in which the distance OQ is equal to the square root of the product of the distances OH and OP; means guiding the linkage and maintaining said distance relation between these points as the linkage shifts with the shifting in position of any of the points; pressure responsive devices, one being responsive to differential pressure between two pressures and comprising a U-tube subjected to such pressures and a float, and the other pressure device responding to one of the two pressures making the differential pressure and comprising a float and a U-tube sensitive to variations in such pressure; and means communicating the movements of the floats to the linkage shifting the distances between O and H and O and P in response to pressure differences.

21. In a computing instrument, the combination of a linkage connecting four points Q, P, H, O, in which the points P, H, O, are arranged on a bar and the point Q at the vertex of a square and comprising links of equal length and extending from a pivotal connection to the bar, said links being pivotally and slidingly connected with the bar at the points P and H, one side of the square being pivotally secured to the links at the pivotal connection at a distance from the vertex of the square equal to the length of each link and the other side of the square being pivotally connected with the bar at the point O, means shifting one of the connection points between the bar and square to vary the distance relations between the points OP and OH; and mechanism for recording the computations comprising a pen extension from any one of the shifting points.

22. The method of finding a factor for computing the flow of fluid through an orifice which consists in establishing four points P, O, H, Q with the distance OQ equal to the square root of the product of the distances OH and OP, maintaining the relation of these points, moving the point P by and in response to variations in line pressure at one side of the orifice and moving the point H in response to variations in the differential pressure and thus establishing through the distance OQ the square root of the product of the differential pressure and static pressure.

23. In a computing instrument, the combination of a square; a guide member; a connection between one arm of the square and the guide member, said connection being stationary relatively to the member and slidable relatively to the arm of the square; two links of equal length pivotally connected at one end and connected at their opposite ends with the member, the link connections and square connections with the member being maintained in alinement and one of the link connections with the member being slidable; and a pivotal connection between the other arm of the square and the links at a distance from the vertex equal to the length of each of the links.

24. In a computing instrument, the combination of a square; a guide member; a connection between one arm of the square and the guide member, said connection being stationary relatively to the member and slidable relatively to the arm of the square; two links of equal length pivotally connected at one end and connected at their opposite ends with the member, the link connections and square connections with the member being maintained in alinement and both of the link connections with the member being slidable; and a pivotal connection between the other arm of the square and the links at a distance from the vertex equal to the length of each of the links.

25. In a gas measuring apparatus adapted for attachment to a gas main having a metered orifice, two movable members responsive severally in their positions to the static and the differential pressures of gas flowing in the said main, a third movable member responsive to the movements of the two members first named and in its position affording indication of the square root of the product of the static and differential pressures to which the two members first named are severally responsive.

26. In a gas measuring apparatus adapted for attachment to a gas main having a metered orifice, a guideway, two blocks movable severally along said guideway to and from a fixed point, means operative in response to change in the static pressure and means operative in response to change in differential pressure of a stream of gas flowing in said conduit and through said orifice for moving said blocks severally, each in its guideway, a third block movable to and from a fixed point, and means operative by the movement of the two blocks first named for maintaining the third block at a distance from its fixed point always equal to the square root of the product of the distances at which the two blocks first named are remote, each from its fixed point.

27. In a gas measuring apparatus adapted for attachment to a gas main having a metered orifice, a horizontally extending guideway, two blocks movable along said guideway to and from a fixed point, two arms pivoted to swing in vertical plane and each engaging by pin-and-slot connection one of said blocks, means operative in response to change in the static pressure and means operative in response to change in the differential pressure of a stream of gas flowing in said conduit for swinging said arms severally, a third block movable to and from a fixed point, and means operative by the movement of the two blocks first named for maintaining the third block at a distance from its fixed point always equal to the square root of the product of the distances at which the two blocks first named are remote, each from its fixed point.

28. In a gas measuring apparatus adapted for attachment to a gas main having a metered orifice, a U-tube and a body of liquid within the U-tube, the two surfaces of such body of liquid within the tube being subject to the pressures of the stream of gas on the two sides of the orifice, a float resting upon the body of liquid within the U-tube, recording apparatus including a crank-arm swinging on a fixed axis, and pin-and-slot connection between the said float and the said crank-arm.

In testimony whereof I have hereunto set my hand.

ARCHER EVERETT YOUNG.